United States Patent [19]

Kordesch et al.

[11] Patent Number: 5,011,752
[45] Date of Patent: Apr. 30, 1991

[54] RECHARGEABLE ALKALINE MANGANESE DIOXIDE-ZINC CELL HAVING IMPROVED CUMULATIVE CAPACITY

[75] Inventors: Karl Kordesch, Lakewood, Ohio; Josef Gsellmann, Graz, Austria; Klaus Tomantschger, Mississauga, Canada

[73] Assignee: Battery Technologies Inc., Mississauga, Canada

[21] Appl. No.: 400,712

[22] Filed: Aug. 30, 1989

[30] Foreign Application Priority Data

Aug. 31, 1988 [HU] Hungary .............................. 4507/88

[51] Int. Cl.$^5$ .............................................. H01M 4/50
[52] U.S. Cl. ...................................... 429/206; 429/224
[58] Field of Search ................................ 429/206, 224

[56] References Cited

U.S. PATENT DOCUMENTS

| | | | |
|---|---|---|---|
| 3,716,411 | 2/1973 | Ogawa et al. | 429/244 |
| 3,945,847 | 3/1976 | Kordesch et al. | 429/224 |
| 4,328,288 | 5/1982 | Taylor | 429/224 |
| 4,384,029 | 5/1983 | Kordesch et al. | 429/224 |
| 4,451,543 | 5/1984 | Dzieciuch et al. | 429/224 |

FOREIGN PATENT DOCUMENTS 0135575 12/1983 Japan ................................... 429/224

*Primary Examiner*—Donald L. Walton
*Attorney, Agent, or Firm*—Donald E. Hewson

[57] ABSTRACT

This invention relates to rechargeable alkaline electrochemical cells, having manganese dioxide cathodes. Generally, those cells have zinc anodes and an alkaline electrolyte, but several other options are considered. In any event, the present invention provides an improved cell by providing a pre-conditioned manganese dioxide cathode, where the net oxidation state of the cathode at the time that the cell is finally assembled and sealed is such that the manganese dioxide is, in fact, $MnO_x$ where x is between 1.70 and 1.90. The preconditioned cell may be preconditioned by cycling the cathode in a unsealed cell, then replacing the zinc anode and sealing the cell; or by adding a reduction agent to the manganese dioxide cathode prior to the time when the cell is finally assembled and sealed; or by adding an overcharge reserve material to the cathode. By pre-conditioning the active cathode material, essentially partially reducing the oxidation state, the cumulative capacity of the cell, and its cycle life, are improved. Since the first cycle of a sealed manganese dioxide-zinc cell is a discharge, followed by a re-charge, the present invention assures that the re-charge efficiency of the cell is improved. In that manner, essentially a complete re-charge of the cell can be effected, even following the first discharge cycle. The invention also contemplates that the preconditioned manganese dioxide cathode may also be utilized, with a suitable non-aqueous electrolyte, in a rechargeable manganese dioxide-lithium cell.

29 Claims, 1 Drawing Sheet

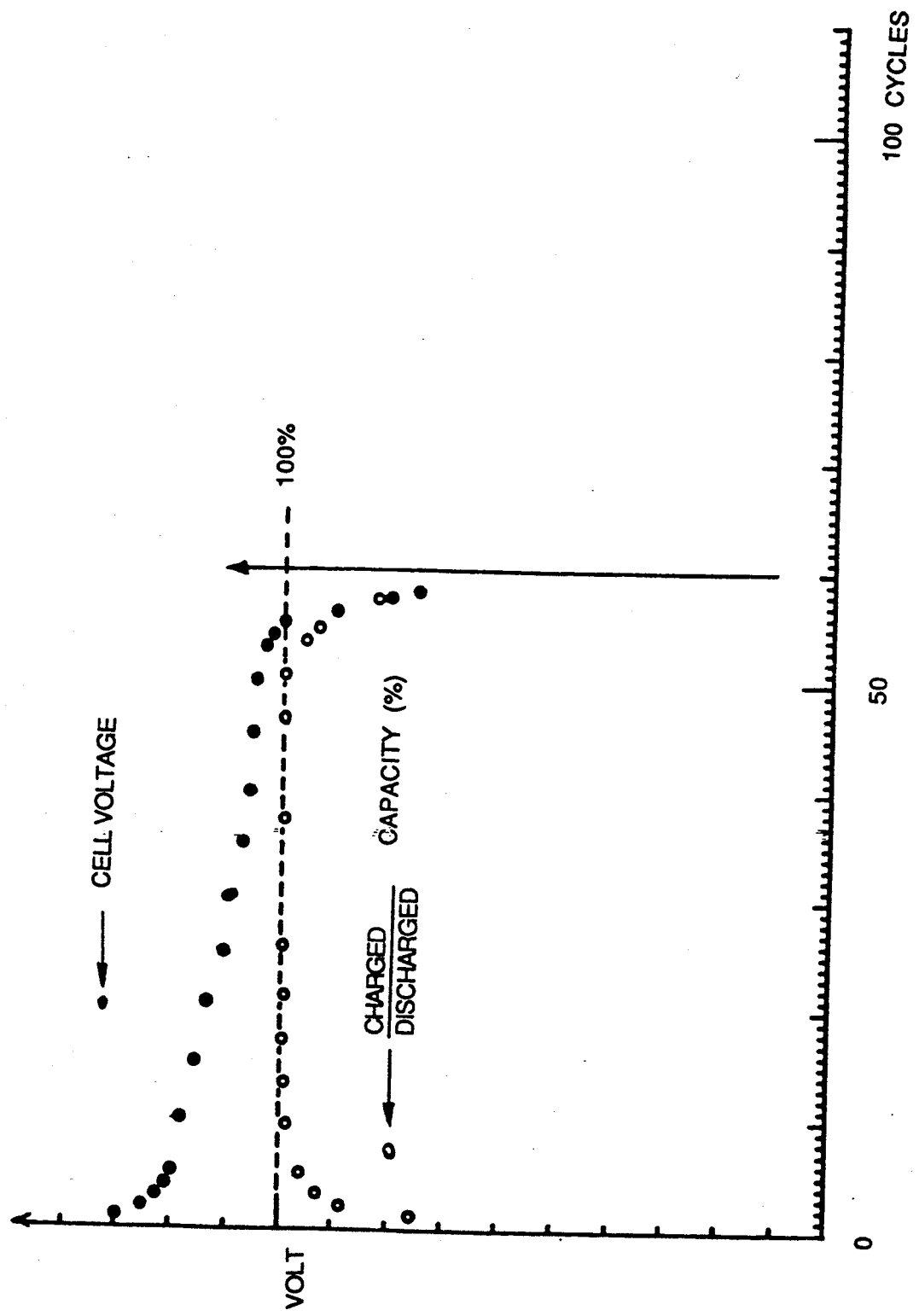

RECHARGEABLE ALKALINE MANGANESE DIOXIDE-ZINC CELL HAVING IMPROVED CUMULATIVE CAPACITY

FIELD OF THE INVENTION

This invention relates to rechargeable cells having manganese dioxide cathodes. Generally, such cells are alkaline manganese dioxide-zinc cells; but other cell systems are contemplated including cells having alkaline electrolytes and anodes such as hydrogen, iron, cadmium, mercury, lead, or bismuth; or cells having lithium anodes, manganese dioxide cathodes and non-aqueous electrolyte. What the present invention particularly provides is a manganese dioxide cathode which is preconditioned in such a manner as to be partially reduced—that is, its oxidation state is below 2.0 and is generally in the range of 1.70 to 1.90. A variety of different means by which the partially reduced manganese dioxide cathode may be obtained, are contemplated.

BACKGROUND OF THE INVENTION

It has been recognized that, when a rechargeable alkaline manganese dioxide-zinc cell—or, for that matter, other cells as discussed hereafter—is first assembled, it is fully charged so that the first cycle to which the cell is subjected in use is a discharge cycle. This is, of course, in contradistinction to such alkaline cells as nickel cadmium cells, which must be charged prior to their initial use.

However, it has also been noted that such cells as alkaline manganese dioxide-zinc cells have an inefficiency when first discharged and recharged, so that there is a loss of cumulative capacity in such cells. Of course, there has also been a negative impact to the storage capacity of such cells, which has been eliminated by limiting the discharge capacity of the zinc anode to a pretermined fraction of the discharge capacity of the cathode, as noted in Awano U.S. Pat. No. 3,530,496. See also Kordesch, "Batteries", published by Markkel Dekker, 1974, at page 288.

The following discussions are generally related to rechargeable manganese dioxide-zinc cells, being cells which have a cathode in which manganese dioxide is the active material, and an anode in which zinc is the active material, with an alkaline electrolyte. The specific nature of the cathode, and certain typical formulations therefore, are discussed hereafter. Likewise, typical examples of anodes that are formulated using powder zinc are discussed.

What the present invention provides, however, is a cathode which is preconditioned, so as to improve the cumulative capacity and the cycle life of the cell.

Generally, the electrolyte is a 6 N KOH to 12 N KOH. The anolyte—which is essentially electrolyte which is used for formulating the anode—is generally also 6 N to 12 N KOH, but may have zinc oxide dissolved in it, in an attempt to reduce corrosion of the zinc metal of the anode, and so as to provide an overcharge reserve.

The separator which is used between the cathode and the anode is generally a cellulose, non-woven material, which may have an optional fibre structure in it for reinforcement.

As to the anode, it is generally a zinc powder mixed with a gelling agent which may be such as NaCMC. Corrosion inhibitors such as mercury may also be included in the anode formulation, in an attempt to reduce hydrogen gassing within the cell.

The following discussion is directed to the characteristics of the anode and the cathode, relating to several observed and theoretical explanations for the reasons that rechargeable alkaline manganese-zinc cells experience decreasing capacity during the first few cycles of their life.

Anode Characteristics

It has been shown in the literature that secondary alkaline zinc electrodes must be overcharged in order to utilize maximum capacity and cycle life For example, Bucci et al, DOE BATTERY AND ELECTROCHEMICAL CONTRACTOR CONFERENCE, Arlington, Va., Dec. 10 to 12, 1979, report that the optimum overcharge for a zinc anode is in the range of 105%. This overcharge can easily be accommodated in such as a nickel-zinc cell where the nickel oxide electrode produces oxygen on overcharge. Often, secondary zinc cells may include a reserve capacity of ZnO to enable the replenishment of zinc lost due to zincate formation, dendritic growth, or shape change within the anode. Kordesch, U.S. Pat. No. 4,091,178, has suggested the use of a charge reserve mass adjacent zinc electrode, so as to obtain a more uniform discharge capacity. However, Kordesch suggests that a large amount of zinc oxide (typically over 20%) will reduce the high initial discharge capacity due to early passivation of the anode, but that does not prevent the decline in discharge capacity in the first 5 to 15 deep discharge cycles of the cell.

Because, as stated above, rechargeable alkaline manganese-zinc cells are fully charged when first manufactured, their active life starts immediately after their production; and when they are put into use, the first cycle that occurs for them is a discharge cycle. The storage capacity of the cell is at a maximum in that first cycle. Thereafter, the ampere-hour capacity that can be supplied to the cell in the following charging cycle is somewhat smaller than the capacity of the cell in the first instance. The available discharge capacity of the cell gradually decreases in subsequent discharge/charge cycles, until it reaches a fairly stable level after about the first five or ten cycles.

During the first few cycles, a certain portion of the active zinc mass of the cell becomes inactive. Typically, a gelled cylindrical anode having a central current collector (the nail) as it may be used in cylindrical rechargeable alkaline manganese-zinc cells may have in the order of 50% to 70% by weight (amalgamated) of the zinc powder. Electrical conductivity within the gelled anode is established through the contact of the individual metallic zinc particles within the anode (the zinc chain). However, as discharge proceeds, the highly conductive zinc particles are oxidized to become non-conductive ZnO or Zn(OH2), each of which is solid. Later, the zinc oxide or zinc hydroxide may dissolve to form zincate ions. However, after the electrolyte in the neighbourhood of the metallic zinc particles is locally saturated with zincate, the compounds no longer dissolve and the discharge reaction will stop due to passivation of the anode. (This is particularly discussed in Falk and Salkind, "Alkaline Storage Batteries", published by John Wiley & Sons, 1969 at pages 156–159).

When the cell is recharged, zinc is replated in the anode, initially near the nail or current collector, but the conductive zinc chain which originally existed can no longer be completely re-established without a significant overcharge of the cell. The addition of conductive additives which do not participate in the discharge and charge reaction will remedy this situation.

Manganese Dioxide Characteristics

Falk and Salkind, above, at pages 180–182, describe the discharge reaction of manganese dioxide in alkaline solution. The discharge reaction is quite complex, and may proceed in various steps. It is now generally accepted that the mechanism proposed by Kozawa best describes the discharge of manganese dioxide ("Batteries", Volume 1, Manganese Dioxide—edited by Kordesch—Chapter 3). The MnO2 discharge curve has a sloping characteristic, indicating a homogenous phase reaction. The potential of the MnO2 changes continuously while protons originating from the water of the electrolyte are introduced into the ionic lattice of the manganese dioxide, according to the equation:

$$MnO_2 + H_2O + e' = MnOOH + OH' \qquad \text{(equation 1)}.$$

However, the MnO2 lattice expands, and at a certain point during the discharge, the mechanism changes. After that time, the discharge occurs in a heterogenous phase reaction, according to the reaction:

$$MnOOH + H_2O + e' = Mn(OH)_2 + OH' \qquad \text{(equation 2)}.$$

This second reaction step involves the dissolution of the MnOOH in the form of [Mn(OH)4]', with electrochemical reduction on the graphite in the manganese dioxide cathode to [Mn(OH)4]'', and the precipitation of Mn(OH)2 from it.

However, in practical terms having regard to rechargeable manganese dioxide-zinc cells, this second steps occurs at a voltage (under 0.9 volts) that is too low so as to contribute significantly, if at all, to the service life of the cell. It appears that the second step is irreversible, that it is accelerated at higher temperatures, that it is accelerated by a higher KOH concentration, and that it responds to complexing agents. More recently, however, Dzieciuch et al. in U.S. Pat. No. 4,451,543 suggest that such MnO2 may be rechargeable to the two electron level. Using x-ray techniques on chemically reduced gamma MnO2 (electrochemical manganese dioxide—EMD) it has been found that MnO2 was reduced in a homogenous phase to MnO1.6, thereby forming an alpha MnOOH (groutite) having a gamma structure. Beta MnO2 (chemical manganese dixoide—CMD) was only reduced homogenously to about MnO1.96 or MnO1.98. It has also been suggested that there is an homogenous phase reduction to MnO1.7, representing rhombic groutite structure.

Boden et al, J. Electrochem. Soc. 114, at 415 (1967) confirm that the discharge of EMD is an homogenous phase discharge, but they postulate an amorphous intermediate. This was because the internal resistance was found to rapidly increase with MnO1.6, and that it reached a 10-fold value of MnO2 at about MnO1.4.

Euler in Electrochimica Acta 15, at 1233 (1970) in his studies of commercial battery electrodes reveals the influence of conductivity of the cathode mix and electrolyte penetration. This is complicated, however, by the ability of MnO2 cathodes to recuperate from an homogenous phase discharge. This suggests that there are potential gradiants under load conditions, which has been recognized, from which it is suggested that rechargeable MnO2 electrodes may have been locally over-discharged.

It has long been recognized that MnO2 that has been discharged in the homogenous phase may be recharged. However, any Mn3O4 that is formed is not capable of being recharged. Mn(OH)2 could be reoxidized to Mn3O4. There is no evidence that MnOOH is to be found.

As noted, the reversible behaviour of MnO2 in the presence of an alkaline electrolyte depends on the concentration of the electrolyte. In primary alkaline and rechargeable alkaline manganese dioxide cells, 6 to 12 N KOH is typically used. Then, the initial discharge capacity of the MnO2 cathode is significantly greater than any discharge capacity after the first discharge. (See Kang and Liang, Electrochemica Acta, 1968, Volume 13, pages 277–281.) It has also been shown that, depending on the KOH concentration, the oxidation state achieved during recharge at a voltage of about 1.72 volts—that which is generally the initial terminal voltage of a taper charger—is to MnOx with x being in the range of from 1.68 to 1.85.

However, in lower KOH concentrations of, for example, 1 N, a more efficient recharge to [Mn(IV)] occurs, whereas in highly concentrated electrolytes—say, 10 N—reoxidation of the MnOx to a maximum oxidation number of 3.2 can be achieved. That suggests, therefore, that in concentrated electrolytes the initial capacity of the rechargeable alkaline manganese electrode cannot be recovered by anodic recharging.

Moreover, the practical range of KOH concentrations for rechargeable manganese dioxide-zinc cell is in the order of 6 to 10 N KOH, because otherwise the anode capacity would passivate too early.

It is due to these inefficiencies in the MnO2 electrode in the presence of concentrated KOH electrolyte, that a significant decline of capacity of the cell occurs in the early cycles. Experiments have been performed which show that raising the maximum voltage of the taper charger does not enable effective recharge of the MnO2 cathode; and that, in fact, as the maximum charge voltage increases there is a formation of soluble manganate [MnVI] and oxygen starts to evolve. This, of course, results in early failure of the manganese dioxide cathode.

Still further, in a rechargeable manganese dioxide-zinc cell, there may be migration of the zincate from the anode to the cathode. Zincate ions can be transported to the manganese dioxide cathode and there form a mixed oxide (hetaerolite, ZnOxMn2O3), and that hetaerolite irreversibly affects the behaviour of the manganese dioxide electrode.

One other prior art patent which has shown substantial improvement in the cycle life of an improved rechargeable alkaline manganese dioxide-zinc cell is Kordesch et al. U.S. Pat. No. 4,384,029.

PURPOSES OF THIS INVENTION

It is the principle purpose of this invention to eliminate or at least to substantially reduce the loss of discharge capacity in the early cycle life of a cell having a manganese dioxide cathode. Such cells are generally rechargeable alkaline manganese-zinc cells, but other cell systems are discussed.

By so doing, the purpose of improving the cummulative capacity over the cycle life of the cell is achieved.

Moreover, the present invention has as an objective to provide more uniform storage capacity during the cycle life of the cell having a preconditioned manganese dioxide cathode in keeping with the present invention.

Still further, the present invention provides for a rechargeable alkaline manganese cathode which is capable of overcharge.

Still further, the present invention provides a rechargeable alkaline manganese cathode having admixed thereto certain materials such that the net oxidation state of the cathode may be predetermined and established in such a manner that the cell exhibits improved cumulative capacity and cycle life.

Yet another purpose of the invention is to provide several different means by which the manganese dioxide material of the cathode may be preconditioned to a predetermined oxidation state.

THE DRAWING

The single figure which accompanies the following discussion shows the ratio between charge capacity and discharge capacity of a typical rechargeable alkaline manganese cathode, and illustrates certain goals achieved by the present invention.

DESCRIPTION OF THE PREFERRED EMBODIMENTS

It will be noted that the present invention specifically recognizes that a manganese dioxide cathode, when recharged by such a device as a taper charger, may be responsible for the inactivation of a portion of the zinc anode during the initial few cycles of a secondary cell.

Having regard to FIG. 1, the characteristic changes of cell voltages are shown in the upper series of readings; and the ratios of the charged capacity to the discharge capacity at each cycle, in percent, are shown in the lower curve. Again, it is to be remembered that a manganese dioxide-zinc cell is fully charged when assembled, and that it is discharged before it is charged. The first charge cycle is shown to be only about 75%, the next charge cycle about 88%, the third 92%, the fourth 97%, and thereafter about 99%.

The cell is a prior art cell, and the drawing is labelled accordingly, and shows the results of the cell having a 9 N KOH electrolyte.

From the figure, the corresponding oxygen content of the resulting manganese dioxide may be calculated. The oxidation state is shown in Table 1, below, for typical readings on the curve.

TABLE 1

| Cycle Number | Oxidation state of MnOx |
|---|---|
| 0 | 1.930 |
| 1 | 1.889 |
| 5 | 1.837 |
| 10 | 1.820 |
| 20 | 0.800 |
| 50 | 1.780 |

After about the first five cycles, a stable capacity of the manganese dioxide material is maintained, so it is shown that the manganese dioxide material has changed from typically MnO1.90 to MnO1.95 to become MnO1.7 to MnO1.9. From this, it is seen that the recharge of the rechargeable alkaline manganese-zinc cell is not capable to establish the manganese dioxide material to reach original oxidation state. In other words, the MnO2 as provided ordinarily by suppliers of battery grade manganese dioxides can not be reestablished as to its oxide state even after the first discharge of the rechargeable cell.

At the same time, and as noted above, it must also be remembered that a portion of the available zinc anode capacity has been lost, thereby resulting in a further declining discharge capacity of the zinc limited rechargeable alkaline manganese-zinc cell.

In keeping with the present invention, these problems can be significantly or substantially reduced or eliminated, by placing in the cell a preconditioned manganese dioxide cathode. By that, it is meant that when the cell is finally assembled and sealed, the manganese dioxide cathode has been preconditioned so as to establish a net oxidation state of generally between 1.70 and 1.90. In that range, a complete recharge of the MnO2 material is possible. On the one hand, as well, the oxidation state should be low so as to affect the reversable recycling behaviour. On the other hand, it should be high so as to exhibit a reasonably high capacity and cycle life. The oxidation state noted above achieves those purposes.

It should also be noted that, usually, the concentration of the KOH electrolyte is in the order of 6 N to 12 N, most usually 8 N or 9 N. Moreover, the available initial ampere-hour capacity of the cathode is higher than the ampere-hour capacity of the anode; the ratio of the cathode to anode capacity being generally in the range of from 2:1 to 4:3.

The present invention provides a number of different manners by which the manganese dioxide cathode can be preconditioned. They include recycling the cathode, providing for partial discharge of the cathode (electrochemical reduction), providing for the chemical reduction of the manganese dioxide, and incorporating additives in the manganese dioxide so as to provide a cathode overcharge reserve.

In one embodiment of the invention, discussed hereafter with respect to a specific example, the MnOx material of the cathode may be preconditioned by being assembled into an unsealed cell, after which the unsealed cell is discharged, followed by a recharging cycle. Thereafter, the initial zinc anode material—the gelled zinc—is dumped, and replaced with a new gelled zinc anode material having the same characteristics as the previous zinc anode. Thereafter, the cell is sealed.

The MnOx material may also be preconditioned prior to assembly into the cell, by being mixed with a dilute electrolyte which may be 1 N KOH or 1 N carbonate solution. To the electrolyte there may be added an alcohol solution or solutions of salts of titanium or bismuth. In any event, no matter what the electrolyte, there may be a graphite containing manganese dioxide electrode made in cylindrical or plate form, and the MnOx material is electronically precycled in the electrolyte bath before being assembled into the cell.

A further possibility is that the MnO2 cathode material can be extruded into preformed cathodes, placed in a standard 9 N KOH electrolyte or in a special electrolyte such as 1 N KOH or carbonate solution as noted above, and electrochemically prereduced or precycled.

Still further, the MnOx material may be preconditioned before assembly into the cell by mixing a slurry of electrochemical grade manganese dioxide in a fluidized bed with graphite and electrolyte. Thereafter, a negative potential is applied to the slurry.

Still further, reduction agents may be added to the cathode material during its preparation. A specific reduction agent is zinc powder, examples of which are discussed below. Other reduction agents may be oxalic acid, ethylene glycol, N2H4, hydrogen gas—evolving a gas up through the cathode material mix, (KBH4, H) or by corrosion of a metal such as aluminium—nickel oxide, and nickel hydroxide. Still further, the manganese dioxide cathode material may be prereduced prior to its assembly into a cell, by being partially decomposed at an elevated temperature.

The present invention also contemplates the addition of an overcharge reserve material to the manganese dioxide cathode mix. Such overcharge reserve material may be, for example, nickel hydroxide, [Ni(OH)2]; but it is to be noted that this definition comprises a number of complex species, any of which is appropriate.

Another manner by which the manganese dioxide cathode may be preconditioned is to provide an admixture of electrochemical grade dioxide (EMD) together with chemical grade manganese dioxide (CMD), so as to arrive at the desired net oxidation state. Still further, EMD may be mixed with natural manganese dioxide to arrive at the desired net oxidation state.

It is contemplated that the admixture of up to about 4% by weight of sulphur to EMD will precondition the cathode material. The sulphur oxidizes to a sulphate slowly, and when the sulphate is formed the capacity of the manganese dioxide is slightly lowered. Plastic powders which oxidize slowly may also be added to the manganese dioxide cathode mix.

Still further, the electrolysis parameters may be controlled and adjusted during the preparation of secondary grade EMD. By secondary grade, it is meant EMD which is capable of being recharged.

Other cell systems than alkaline manganese dioxide-zinc cells are contemplated, where in any event the electrochemical cell has a manganese dioxide cathode which is capable of being recharged. The anodes in other alkaline cells having preconditioned MnOx cathodes, where x is between 1.70 and 1.90, may include hydrogen, iron, cadmium, mercury, lead, and bismuth.

Still further, it is contemplated that the present invention may be effectively applied to rechargeable electrochemical cells having lithium anodes and manganese dioxide cathodes. In those instances, the cell has a nonaqueous electrolyte, which may be such as propylene carbonate solutions containing LiC104, usually in a one molar concentration. That electrolyte may also be referred to as LiC104/PC. Yet other electrolytes may be LiC104 PC/DME or LiC104 PC/THF.

In any event, the manganese dioxide cathode material is a preconditioned MnOx material having an oxidation state at the time when the cell is finally assembled and sealed such that x is between 1.70 and 1.90. As noted above, the MnOx may be a partially reduced manganese dioxide, having admixed thereto a reduction agent; or it may be preconditioned MnOx material which has an overcharge reserve material added thereto.

There now follows several examples showing different manners by which the preconditioned cathode material has been prepared. In each instance, the initial cathode structure when the cell is finally assembled and sealed comprises MnOx, where x is between 1.70 and 1.90. It is shown that all such cells exhibit a lower degree of decline in capacity during their early cycle life, as compared to control cells which contained primary grade electrolytic manganese dioxide (EMO). Moreover, the cells constructed in keeping with the present invention exhibit superior cycle life.

EXAMPLE 1

In this example, the alkaline manganese dioxide is preconditioned by precycling. Here, cells are built using a zinc anode other than the one which will be used when the cell is finally assembled and sealed. A taper charger is used for recharging.

The following are the compositions used for C size cells:

| Cathode: | Trona EMD | 84.14% | by weight |
|---|---|---|---|
| | Lonza K98 44 Graphite | 8.85% | |
| | SH100 Carbon Black | 0.47% | |
| | 9 N KOH | 6.54% | |
| Separator: | Dexter 9478 | 2.5 turns | |
| | Cellulose F380 | 1.25 turns | |
| Anode: | Zinc (6% Hg) | 54.4% | by weight |
| | ZnO | 10.0% | |
| | Gelling agents | 1.0% | |
| | 9 N KOH 5% ZnO | 34.6% | |

It will be noted that the anode material has about 6% by weight mercury amalgamated therein; and that the anolyte has about 5% zinc oxide dissolved in 9 N KOH.

30 cells were produced. Of these, 15 cells were closed and crimped and sealed, so as to form the control group. For the other 15 cells, after the gelled zinc anode was inserted, they were not sealed. All cells were then discharged at 150 mA to 0.9 volts, they were rested for 2 hours, and subsequently recharged using a taper charger having an initial voltage set at 1.72 volts, for 48 hours.

The anodes of the unsealed cells were then dumped and replaced by new anodes, having the identical composition; and those cells were then sealed so as to form the experimental cell group having preconditioned cathodes. All of the cells were then cycled under identical conditions, for 5 cycles. Table 2 shows the results of the first five cycles, demonstrating the discharge capacity of the cells during each cycle. (The figures are average figures for each group).

TABLE 2

| | DISCHARGE CAPACITY | |
|---|---|---|
| Cycle Number | Control Cell [Ah] | Pre-conditioned Cell [Ah] |
| 1 | 2.70 | 2.66 |
| 2 | 2.00 | 2.44 |
| 3 | 1.70 | 2.05 |
| 4 | 1.60 | 1.85 |
| 5 | 1.50 | 1.80 |
| Cumulative Capacity | 9.50 | 10.80 |
| Change [%] | | +14 |

It is clearly shown in Table 2 that the preconditioned cells do not exhibit the same decline in capacity, as was experienced with the control cells where the cathodes were not subjected to preconditioning.

Other general approaches to this preconditioning process are as follows:

A plate electrode is made from essentially the same cathode formulation as noted above. Then, the electrode is placed in a standard 9 N KOH electrolyte or in a low normality electrolyte bath and cycled with a dummy anode in much the same manner as noted above, but for about two to five discharge and re-charge cycles. Then, the plate may be assembled into a flat cell, or the material may be carefully re-ground and compacted into a cylindrical cathode for assembly into a cylindrical cell.

EXAMPLE 2

In this example, the manganese dioxide material of the cathodes was prereduced using chemical means, by adding zinc powder to the cathode mix during the time that the cathode was being prepared. The addition of the zinc powder resulted in partial reduction of the manganese dioxide.

The following are the particulars of the cells that were manufactured, for this series of experiments, in each case the cells being AA size cells:

|  |  |  | Control | Test Cell |
|---|---|---|---|---|
| Cathode: | Trona EMD |  | 84.14% | 82.43% |
|  | Lonza KS 44 Graphite |  | 7.85% | 7.88% |
|  | Graphite Fibre |  | 1.00% | 1.00% |
|  | SH100 Carbon Black |  | 0.47% | 0.47% |
|  | Zn |  | — | 1.68% |
|  | 9 N KOH |  | 6.54% | 6.54% |
| Separator: | Dexter 9478 | 2.5 turns |  |  |
|  | Cellulose F380 | 1.25 turns |  |  |
| Anode: | Zinc (6% Hg) |  | 54.4% | 54.4% |
|  | ZnO |  | 10.0% | 10.0% |
|  | Gelling agents |  | 1.0% | 1.0% |
|  | 9 N KOH 5% ZnO |  | 34.6% | 34.6% |

The cells were then subjected to a deep discharge recycling regime, where they were discharged into a 24 Ohm load resistor to a 0.90 volt cut-off voltage. They were then recharged using a taper charger for 24 hours, having a maximum charging current of 500 mA, and having an initial terminal voltage of 1.72 volts.

Table 3 shows the beneficial effects of the addition of zinc as the reduction agent to the manganese dioxide cathode material.

TABLE 3
COMPARISON OF THE INITIAL CYCLING PERFORMANCE OF CELLS

|  | Control Cell | Test Cell |
|---|---|---|
| Initial Capacity [mAh] | 910 | 1100 |
| 5th Cycle Capacity [mAh] | 660 | 930 |
| Capacity Change [%] | −27 | −15 |
| Cumulative Capacity [mAh] | 3720 | 4540 |
| Change [%] | 0 | +22 |
| 10th Cycle Capacity [mAh] | 480 | 870 |
| Capacity Change [%] | −47 | −21 |
| Cumulative Capacity [mAh] | 6470 | 8750 |
| Change [%] | 0 | +35 |

Table 4 demonstrates the increase of the cycle life of a test cell compared with the control cell, especially as to their cumulative capacity. There were three different sets of tests. The first was a daily cycling into 24 Ohms, with a 7 hour discharge to 0.9 volts cut off. The second was a daily cycling into 10 Ohms for a 4 hours discharge, to 0.9 volts cut off. The third was a deep discharge to 0.9 volts cut off into a 24 Ohm load, followed by a 24 hour recharge, to determine the number of cycles where the discharge capacity exceeded 390 mAh capacity. For all the tests, the cumulative capacity in Ah, and the percentage change of cumulative capacity of the test cell with respect to the control cell, is noted.

TABLE 4
COMPARISON OF THE CYCLE LIFE OF CELLS

| Test Regime | Control Cell | Test Cell |
|---|---|---|
| Daily Cycling 24 Ohm, 7 hour discharge |  |  |
| 0.9 V Cut Off | 150 | 375 |
| Cumulative Capacity (Ah) | 52.50 | 131.3 |
| % Change | — | +150 |
| Daily Cycling 10 Ohm, 4 hour discharge |  |  |
| 0.9 V Cut Off | 65 | 120 |
| Cumulative Capacity (Ah) | 32.5 | 60.0 |
| % Change | — | +85 |
| Deep Discharge to 0.90 Volt 24 Ohm load, 24 hour |  |  |
| Recharge Number of Cycles Exceeding 390 mAh Capacity | 50 | 47 |
| Cumulative Capacity (Ah) | 25.36 | 29.96 |
| % Change | — | +18 |

EXAMPLE 3

These tests were made to determine the effects of providing an overcharge reserve in the cathode. In this case, nickel hydroxide was added during the cathode preparation process, whereby means for generating oxygen on overcharge was incorporated into the cell.

The following formulations were used:

|  |  |  | Control | Test Cell |
|---|---|---|---|---|
| Cathode: | Trona EMD |  | 84.14% | 82.43% |
|  | Lonza KS 44 Graphite |  | 7.85% | 7.88% |
|  | Graphite Fibre |  | 1.00% | 1.00% |
|  | SH100 Carbon Black |  | 0.47% | 0.47% |
|  | Ni(OH)2 |  | — | 1.68% |
|  | 9 N KOH |  | 6.54% | 6.54% |
| Separator: | Dexter 9478 | 2.5 turns |  |  |
|  | Cellulose F380 | 1.25 turns |  |  |
| Anode: | Zinc (6% Hg) |  | 54.4% | 54.4% |
|  | ZnO |  | 10.0% | 10.0% |
|  | Gelling agents |  | 1.0% | 1.0% |
|  | 9 N KOH 5% ZnO |  | 34.6% | 34.6% |

The cells were then subjected to a deep discharge recycling regime, where they were discharged into a 24 Ohm load resistor to a 0.90 volt cut-off voltage. They were then recharged using a taper charger for 24 hours, having a maximum charging current of 500 mA, and having an initial terminal voltage of 1.72 volts.

Table 5 shows the beneficial effects of the addition of zinc as the reduction agent to the manganese dioxide cathode material.

TABLE 5
COMPARISON OF THE INITIAL CYCLING PERFORMANCE OF CELLS

|  | Control Cell | Test Cell |
|---|---|---|
| Initial Capacity [mAh] | 910 | 960 |
| 5th Cycle Capacity [mAh] | 660 | 730 |
| Capacity Change [%] | −27 | −24 |
| Cumulative Capacity [mAh] | 3720 | 4030 |
| Change [%] | 0 | +8 |
| 10th Cycle Capacity [mAh] | 480 | 700 |
| Capacity Change [%] | −47 | −27 |
| Cumulative Capacity [mAh] | 6470 | 7790 |
| Change [%] | 0 | +20 |

Table 6 demonstrates the increase of the cycle life of a test cell compared with the control cell, especially as to their cumulative capacity. There were two sets of tests. The first was a daily cycling into 24 Ohms, with a 7 hour discharge to 0.9 volts cut off. The second was a deep discharge to 0.9 volts cut off into a 24 Ohm load, followed by a 24 hour recharge, to determine the number of cycles where the discharge capacity exceeded 390 mAh capacity. For those tests, the cumulative capacity in Ah, and the percentage change of cumulative capacity of the test cell with respect to the control cell, is noted.

TABLE 6

| COMPARISON OF THE CYCLE LIFE OF CELLS | | |
|---|---|---|
| Test Regime | Control Cell | Test Cell |
| Daily Cycling | | |
| 24 Ohm, 7 hour discharge | | |
| 0.9 V Cut Off | 150 | 360 |
| Cumulative Capacity (Ah) | 52.50 | 126.0 |
| % Change | — | +140 |
| Deep Discharge to .9 V | | |
| 24 Ohm load, 24 hour | | |
| Recharge Number of Cycles Exceeding 390 mAh Capacity | 50 | 51 |
| Cumulative Capacity (Ah) | 25.36 | 31.59 |
| % Change | — | +25 |

A number of examples have been shown as to different manners by which manganese dioxide material of cathodes for rechargeable electrochemical cells may be obtained. In each instance, it is shown that the cumulative capacity of the cells is greater, and that the initial cycling performance of the cells is improved.

Other cell systems have been proposed, including various anode materials which may be used in association with manganese dioxide cathodes and alkaline electrolytes, and rechargeable lithium cells with non-aqueous electrolytes and manganese dioxide cathodes are contemplated.

The examples show various test results, illustrating the purposes achieved by the present invention, and are not intended to be limiting. The ambit of the present invention is defined in the following claims.

We claim:

1. A rechargeable alkaline electrochemical cell having an anode, an alkaline electrolyte, and a manganese dioxide cathode, in which cell the cathode has been preconditioned before the cell is finally assembled and sealed;
    wherein said manganese dioxide material of said cathode is a preconditioned MnOx material having an oxidation state at the time when said cell is finally assembled and sealed such that x is between 1.70 and 1.90.

2. The rechargeable alkaline electrochemical cell of claim 1, having a zinc anode; wherein said MnOx material is preconditioned by being assembled into an unsealed cell, discharging said unsealed cell, recharging said unsealed cell, and then replacing the initial zinc anode material with new zinc anode material; and thereafter sealing said cell.

3. The rechargeable alkaline electrochemical cell of claim 2, wherein said cathode has an initial formulation of about 80 to 88% by weight of electrochemical grade manganese dioxide; about 7 to 10% by weight of an admixture of graphite and graphite fibre; about 0 to 1% by weight of carbon black; and about 5.5 to 7.5% by weight of 9 N KOH.

4. The rechargeable alkaline electrochemical cell of claim 1, wherein said MnOx material is preconditioned prior to assembly into said cell by being mixed with dilute electrolyte chosen from the group consisting of 1 N KOH, and 1 N carbonate solutions, with or without one or more of the group of additives chosen from the group consisting of alcohols, salts of titanium, and salts of bismuth.

5. The rechargeable alkaline cell of claim 4, wherein said MnOx material and electrolyte has been electrochemically precycled in association with a dummy electrode such as a graphite electrode.

6. The rechargeable alkaline electrochemical cell of claim 1, wherein said MnOx material is preconditioned before assembly into said cell by mixing a slurry of electrochemical grade manganese dioxide in a fluidized bed with graphite and electrolyte, and applying a negative potential thereto.

7. The rechargeable alkaline electrochemical cell of claim 1, wherein the anode of said cell is chosen from the group consisting of zinc, hydrogen, iron, cadmium, mercury, lead and bismuth.

8. The rechargeable alkaline electrochemical cell of claim 7, wherein the initial ampere-hour capacity of the cathode is higher than the ampere-hour capacity of the anode; the ratio of the cathode to anode capacities being in the range of from 2:1 to 4:3.

9. The rechargeable alkaline electrochemical cell of claim 1, wherein said manganese dioxide cathode is preconditioned by making an admixture of electrochemical grade manganese dioxide and chemical grade manganese dioxide, to arrive at the desired net oxidation state.

10. The rechargeable alkaline electrochemical cell of claim 1, wherein said manganese dioxide cathode is preconditioned by making an admixture of electrochemical grade manganese dioxide and natural manganese dioxide ore, to arrive at the desired net oxidation state.

11. The rechargeable alkaline electrochemical cell of claim 1, wherein said manganese dioxide cathode material has up to about 4% by weight of sulphur admixed thereto.

12. The rechargeable alkaline electrochemical cell of claim 1, wherein the oxidation state of said manganese dioxide cathode material is obtained by adjusting the electrolysis paramaters for the production of secondary grade electrochemical manganese dioxide.

13. The rechargeable alkaline cell of claim 1, having a zinc anode; wherein said MnOx material is preconditioned by being formed into a flat plate; placed into a standard 9 N KOH electrolyte or into a low normality alkaline electrolyte bath, together with a dummy electrode; discharged and recharged about two to five times; then placed in a cell together with a zinc anode and an alkaline electrolyte; and thereafter sealing said cell.

14. The rechargeable alkaline cell of claim 13, wherein after said discharge and recharge cycling is completed, said MnOx material is re-ground and compacted into a new cathode element for assembly into a sealed cylindrical cell.

15. A rechargeable alkaline electrochemical cell having an anode, an alkaline electrolyte, and a manganese dioxide cathode, in which cell the cathode has been preconditioned before the cell is finally assembled and sealed;
    wherein said manganese dioxide cathode has a reduction agent added thereto prior to the time when said cell is finally assembled and sealed, such that said manganese dioxide is partially reduced to MnOx, where x is between 1.70 and 1.90.

16. The rechargeable alkaline electrochemical cell of claim 15, wherein said manganese dioxide cathode has an initial formulation of about 80 to 88% by weight of electrochemical grade manganese dioxide; about 7 to 10% by weight of an admixture of graphite and graphite fibre; about 0 to 1% by weight of carbon black; about 5.5 to 7.5% by weight of 9 N KOH; and about 0.1 to 10.0% by weight of a chemical reduction agent.

17. The rechargeable alkaline electrochemical cell of claim 16, wherein said reduction agent is zinc powder.

18. The rechargeable alkaline electrochemical of claim 16, wherein said reduction agent is chosen from the group consisting of oxalic acid, ethylene glycol, N2H4, hydrogen gas, KBH4, aluminium, nickel oxide, and nickel hydroxide.

19. The rechargeable alkaline electrochemical cell of claim 15, wherein said manganese dioxide cathode is prereduced prior to assembly into said cell by being partially decomposed at an elevated temperature.

20. The rechargeable alkaline electrochemical cell of claim 15, wherein the anode of said cell is chosen from the group consisting of zinc, hydrogen, iron, cadmium, mercury, lead, and bismuth.

21. The rechargeable alkaline electrochemical cell of claim 20, wherein the initial ampere-hour capacity of the cathode is higher than the ampere-hour capacity of the anode; the ratio of the cathode to anode capacities being in the raten of from 2:1 to 4:3.

22. A rechargeable alkaline electrochemical cell having an anode, an alkaline electrolyte, and a manganese dioxide cathode, in which cell the cathode has been preconditioned before the cell is finally assembled and sealed;

wherein said manganese dioxide material of said cathode is a preconditioned MnOx material having added thereto an overcharge reserve material such that the net oxidation state of said cathode at the time when said cell is finally assembled and sealed is such at x is between 1.70 and 1.90.

23. The rechargeable alkaline electrochemical cell of claim 22, wherein said manganese dioxide cathode has an initial formulation of about 80 to 88% by weight of electrochemical grade manganese dioxide; about 7 to 10% by weight of an admixture of graphite and graphite fibre; about 0 to 1% by weight of carbon black; about 5.5 to 7.5% by weight of 9 N KOH; and about 1 to 10.0% by weight of an overcharge reserve material.

24. The rechargeable alkaline electrochemical cell of claim 23, wherein said overcharge reserve material is Ni(OH)2.

25. The rechargeable alkaline electrochemical cell of claim 22, wherein the anode of said cell is chosen from the group consisting of zinc, hydrogen, iron, cadmium, mercury, lead, and bismuth.

26. The rechargeable alkaline electrochemical cell of claim 25, wherein the initial ampere-hour capacity of the cathode is higher than the ampere-hour capacity of the anode; the ratio of the cathode to anode capacities being in the range of from 2:1 to 4:3.

27. A rechargeable electrochemical cell having a lithium anode, a non-aqueous electrolyte, and a manganese dioxide cathode, in which cell the cathode has been preconditioned before the cell is finally assembled and sealed;

wherein said manganese dioxide material of said cathode is a preconditioned MnOx material having an oxidation state at the time when said cell is finally assembled and sealed such that x is between 1.70 and 1.90.

28. A rechargeable electrochemical cell having a lithium anode, a non-aqueous electrolyte, and a manganese dioxide cathode, in which cell the cathode has been preconditioned before the cell is finally assembled and sealed;

wherein said manganese dioxide cathode has a reduction agent added thereto prior to the time when said cell is finally assembled and sealed, such that said manganese dioxide is partially reduced to MnOx, where x is between 1.70 and 1.90.

29. A rechargeable electrochemical cell having a lithium anode, a non-aqueous electrolyte, and a manganese dioxide cathode, in which cell the cathode has been preconditioned before the cell is finally assembled and sealed;

wherein said manganese dioxide material of said cathode is a preconditioned MnOx material having added thereto an overcharge reserve material such that the net oxidation state of said cathode at the time when said cell is finally assembled and sealed is such that x is between 1.70 and 1.90.

* * * * *